(12) United States Patent
Luo (10) Patent No.: US 7,694,390 B2
(45) Date of Patent: Apr. 13, 2010

(54) HINGE MECHANISM FOR FOLDABLE ELECTRONIC DEVICE

(75) Inventor: Pu Luo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 702 days.

(21) Appl. No.: 11/525,463

(22) Filed: Sep. 22, 2006

(65) Prior Publication Data

US 2007/0011847 A1 Jan. 18, 2007

Related U.S. Application Data

(63) Continuation-in-part of application No. 11/227,716, filed on Sep. 15, 2005, now abandoned.

(51) Int. Cl.
*E05F 1/08* (2006.01)

(52) U.S. Cl. .................... 16/303; 16/330; 379/433.13

(58) Field of Classification Search ........... 16/337–339, 16/342, 330, 303, 374, 376, 377, 340; 361/679.08, 361/679.11, 679.12, 679.27; 455/90.3, 575.1, 455/575.3, 575.8; 379/433.12, 433.13; 348/373, 348/333.01, 333.06, 794
See application file for complete search history.

(56) References Cited

U.S. PATENT DOCUMENTS

| | | | | |
|---|---|---|---|---|
| 6,633,643 B1 * | 10/2003 | Ona | ..................... | 379/433.13 |
| 6,920,668 B2 * | 7/2005 | Hayashi | ..................... | 16/303 |
| 6,985,759 B2 * | 1/2006 | Ona | ..................... | 455/575.3 |
| 7,085,375 B2 * | 8/2006 | Katoh | ..................... | 379/433.13 |
| 7,299,524 B2 * | 11/2007 | Luo | ..................... | 16/303 |
| 2004/0142735 A1 * | 7/2004 | Yi | ..................... | 455/575.3 |
| 2005/0138771 A1 * | 6/2005 | Su | ..................... | 16/330 |
| 2006/0112517 A1 * | 6/2006 | Luo et al. | ..................... | 16/330 |
| 2006/0143861 A1 * | 7/2006 | Luo | ..................... | 16/303 |
| 2007/0245523 A1 * | 10/2007 | Yang | ..................... | 16/330 |

\* cited by examiner

*Primary Examiner*—Chuck Y. Mah
(74) *Attorney, Agent, or Firm*—Clifford O. Chi (57) ABSTRACT

A hinge mechanism includes a shaft (1), a cam (2), a housing (3), an arresting member (6), a cam follower (4), and an elastic member (5). The housing has an open housing end (30), and an opposite partially open housing end (31) including a transverse wall (35). The cam, the cam follower, the elastic member and the arresting member surround the shaft in turn. The cam follower and the elastic member are received in the housing. The cam is partly received in the housing. The transverse wall of the partially open housing end of the housing prevents the cam from sliding further into the housing. The arresting member is disposed adjacent to the open housing end allowing the arresting member sliding into the housing. The cam is rotatable relative to the shaft and non-rotatable relative to the housing, and the cam follower is non-rotatable relative to the shaft.

20 Claims, 8 Drawing Sheets

HINGE MECHANISM FOR FOLDABLE ELECTRONIC DEVICE

CROSS REFERENCE TO RELATED APPLICATION

This application is a Continuation-in-Part of U.S. application Ser. No. 11/227,716, filed on Sep. 15, 2005, the contents of which are hereby incorporated by reference thereto.

FIELD OF THE INVENTION

The present invention generally relates to hinge mechanisms, and more particularly to a hinge mechanism for hinging together housings of a foldable, portable electronic device such as a mobile phone or a PDA (Personal Digital Assistant).

BACKGROUND

Portable mobile phones typically have two housings rotatably joined by a type of hinge that allows the housings to fold upon one another. Many such foldable mobile phones have most of the electronics in one housing, called the main housing, and fewer electronics in the other housing, called the cover. Other such foldable mobile phones have all the electronics in the main housing, with the cover serving only to cover a keypad and a display of the main housing. The main housing and the cover are connected together by a hinge mechanism. Generally, the opening or closing of most covers is achieved by means of cams and a spring of the hinge mechanism.

Figure 8:
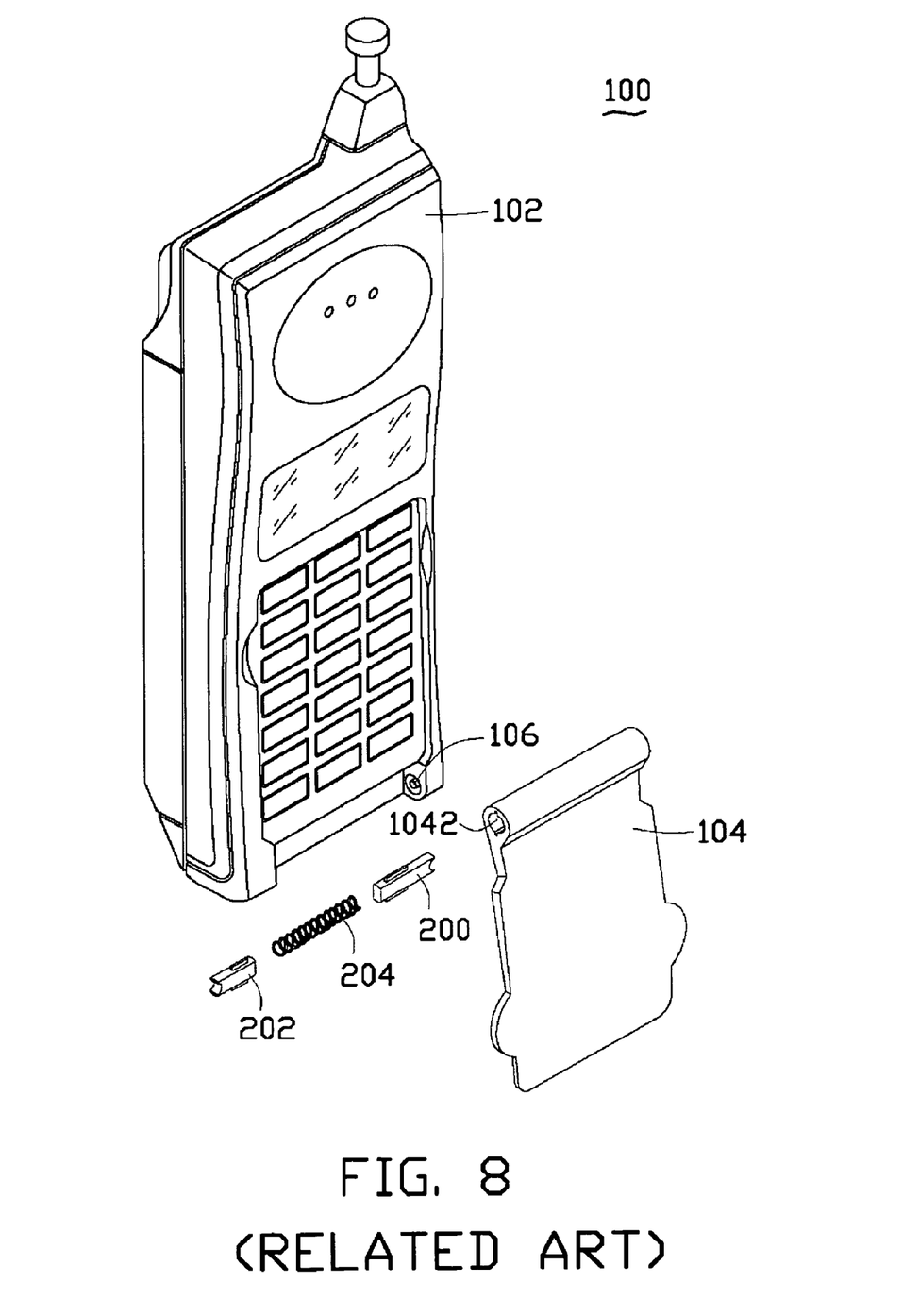
FIG. 8 is an exploded, isometric view of a conventional type of foldable mobile phone with a hinge assembly.

FIG. 8 illustrates a hinge assembly used in a conventional type of foldable mobile phone. The foldable mobile phone 100 includes a main housing 102 and a cover 104. The hinge assembly includes two cams 200, 202, a spring 204, and a pair of posts 106 contained in the main housing 102. A channel 1042 is defined through an end of the cover 104. The cam 202, the spring 204, and the cam 200 are fixed in the channel 1042 in that order. The cams 200, 202 protrude out from the channel 1042 and engage with the posts 106. When the cover 104 is rotated, the cams 200, 202 rotate along with the cover 104, and stop the cover 104 in a position where it maintains an angle of 180° relative to the main housing 102.

However, the hinge assembly includes a variety of individual pieces that must be installed within the foldable mobile phone 100 when the foldable mobile phone 100 is assembled. This does not meet the growing trend for foldable mobile phone manufacturers to use integrated one-piece hinge assemblies that can be quickly and easily press-fitted into foldable mobile phone sub-assemblies during manufacturing. Manufacturing costs associated with non-integrated hinge assemblies are higher than those associated with one-piece hinge assemblies.

What is needed, therefore, is a hinge mechanism which is modularized, easy to install into a foldable electronic device, and low in cost.

SUMMARY

A hinge mechanism for a foldable, portable electronic device includes a shaft, a cam, a housing, an arresting member, a cam follower, and an elastic member. The shaft has a pair of shaft ends. The cam has a cam tip. The housing has opposite housing ends. One housing end is an open housing end, and the opposite housing end is a partially open housing end. The partially open housing end includes a transverse wall and a keyed hole defined in the transverse wall. The cam follower has a cam surface arranged to movably contact the cam tip. The elastic member is provided for providing an elastic force. The cam, the cam follower, the elastic member and the arresting member surround the shaft in turn. The cam follower and the elastic member are received in the housing. The cam is disposed at the partially open housing end with the tip of the cam being received in the housing. The transverse wall of the partially open housing end prevents the cam from sliding further into the housing. The arresting member is disposed adjacent to the open housing end, whereby the arresting member can slide into the housing. The cam is rotatable relative to the shaft and non-rotatable relative to the housing, and the cam follower is slidable and non-rotatable relative to both the shaft and the arresting member and rotatable relative to the housing and rotatable relative to the housing.

The hinge mechanism is simple, easily manufactured, and relatively inexpensive. In addition, the hinge mechanism is modularized, so it is easily installed into the main housing and cover of a foldable mobile phone or other electronic device.

Other advantages and novel features will become more apparent from the following detailed description when taken in conjunction with the accompanying drawings, in which:

DETAILED DESCRIPTION OF PREFERRED EMBODIMENTS

Figure 7:
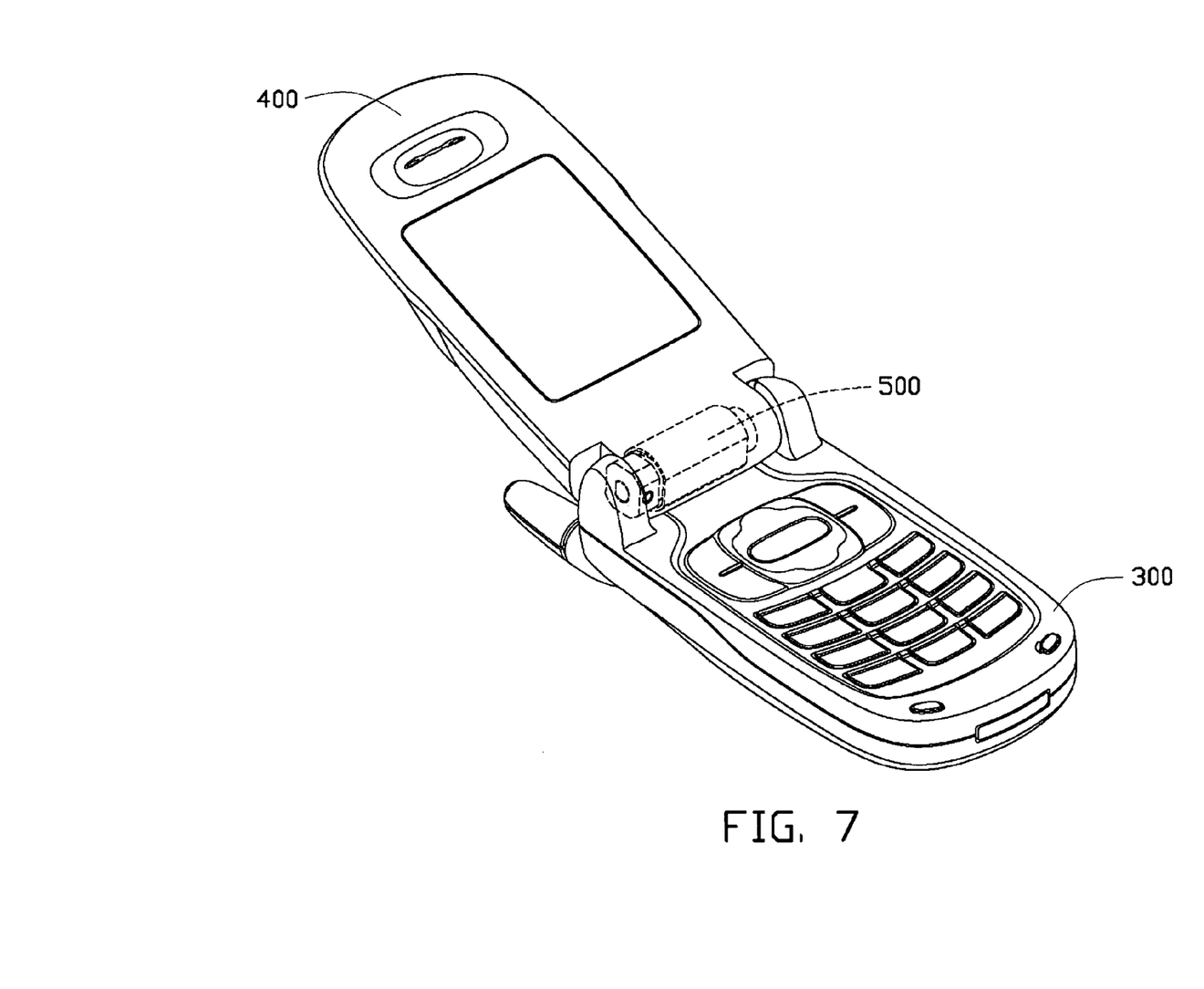
FIG. 7 is an isometric view of a foldable mobile phone having the hinge mechanism of FIG. 3 (shown in phantom) installed therein.

Referring to FIG. 7, a hinge mechanism 500, in accordance with a preferred embodiment of the present invention, is used in foldable mobile phones, PDAs (Personal Digital Assistants), and so on. An exemplary foldable mobile phone or a similar device includes a first part like a main housing 300 and a second part like a cover 400, foldably connected via the hinge mechanism 500. Hereinafter, for brevity, the hinge mechanism 500 only will be described.

Figure 1:
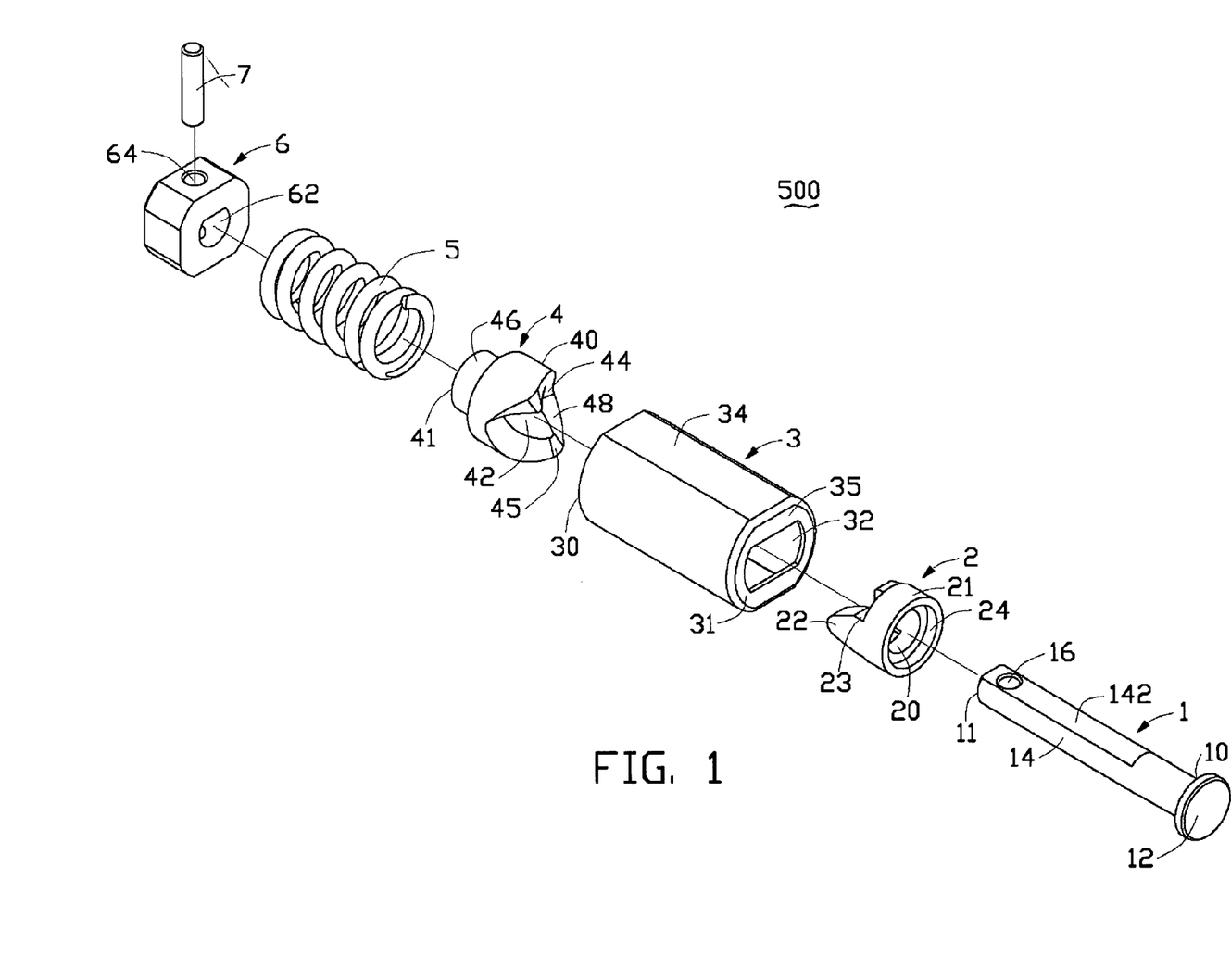
FIG. 1 is an exploded, isometric view of a hinge mechanism in accordance with a preferred embodiment of the present invention.

Referring also to FIG. 1, the hinge mechanism 500 includes a shaft 1, a cam 2, a housing 3, a cam follower 4, a spring 5, an arresting member 6, and a pin 7.

Referring also to FIGS. 2-5, the shaft 1 is column-shaped, and has a first shaft end 10 and an opposite second shaft end 11. The first shaft end 10 has a flange 12. A flattened shaft portion 14 is formed from the second shaft end 11 through a central section of the shaft 1. The flattened shaft portion 14 has a flat surface 142. A transverse hole 16 is defined in the flattened shaft portion 14 proximate the second shaft end 11. An axis of the transverse hole 16 is perpendicular to an axis of the shaft 1.

Figure 2:
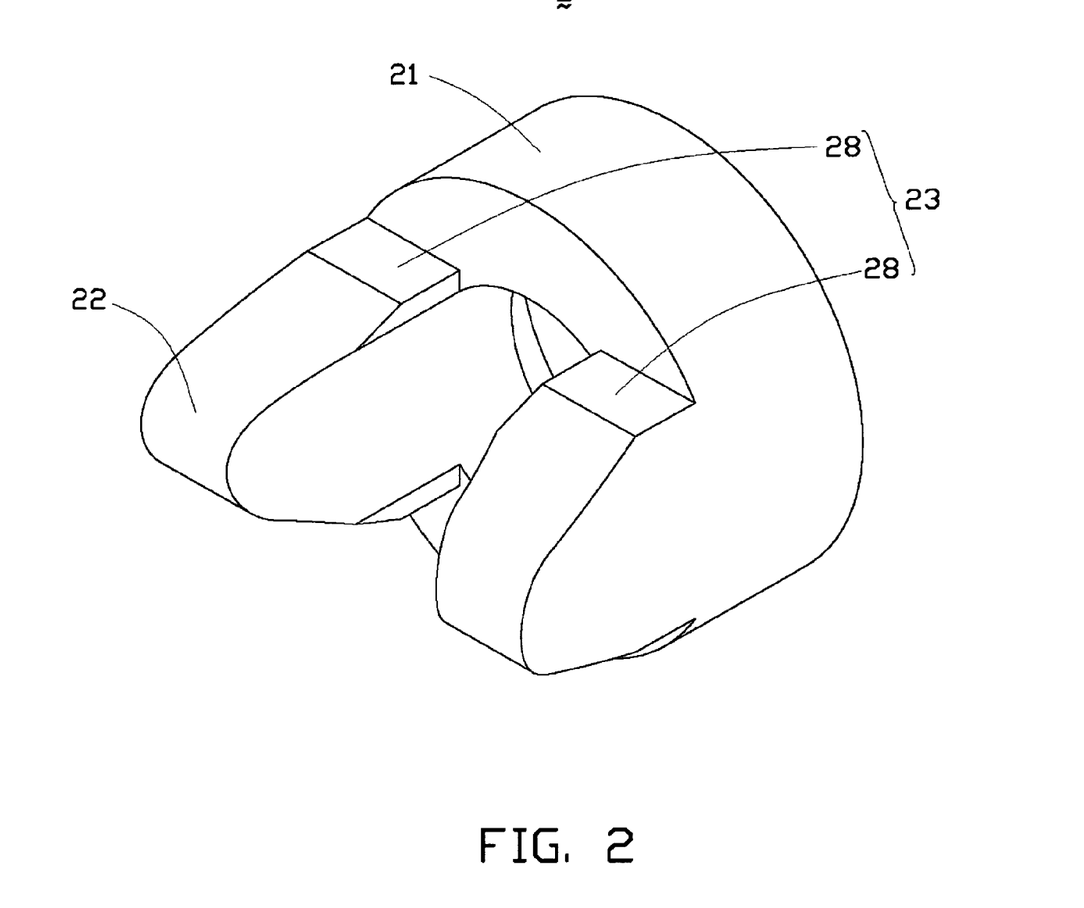
FIG. 2 is a cam of the hinge mechanism of FIG. 1, but viewed from another aspect.

The cam 2 is column-shaped, and a cam hole 20 runs through the cam 2 along an axis thereof. A diameter of the cam hole 20 is smaller than that of the flange 12 of the shaft 1. The cam 2 includes a cylinder-shaped base 21, a pair of tips 22 symmetrically formed, and a keyed portion 23 disposed between the base 21 and the tips 22. The keyed portion 23 includes two connecting portions 28, each having a cross-section of part of a ring and each operatively linking the base 21 and one respective tip 22. Thus, the two connecting portions 28 form the keyed portion 23 having a cross-section with a contour of a symmetrically truncated circle. A fixing hole 24, coaxial with the cam hole 20, is defined in an end of the base 21. The fixing hole 24 is for receiving the flange 12 of the shaft 1. A diameter of the fixing hole 24 is larger than that of the cam hole 20.

The housing 3 is substantially a flattened cylinder, and has a first housing end 30 and an opposite second housing end 31. The housing 3 is open at the first housing end 30, and is partially open at the second housing end 31. The second housing end 31 includes a transverse wall 35 and a keyed hole 32 defined in the housing 3 and extending through in the transverse wall 35. The keyed hole 32 takes a shape of a symmetrically truncated circle, so as to matingly fit with the keyed portion 23. (It is to be understood that the mating shape of keyed portion 23 and keyed hole 32 could be any shape that would essentially eliminate any rotation therebetween.) The transverse wall 35 has a transverse inner end face 36 (shown in FIG. 4) inside the housing 3. The opening at the first housing end 30 and the keyed hole 32 at the second housing end 31 communicate with each other through a central hole (not labeled) of the housing 3. The tips 22 of the cam 2 are received in the central hole of the housing 3, and the keyed portion 23 of the cam 2 is received in the keyed hole 32 of the housing 3. The base 21 of the cam 2 protrudes beyond the housing 3. A main outside wall of the housing 3 forms a pair of parallel fixing surfaces 34, so that the housing 3 can fittingly engage in the cover 400 of the foldable mobile phone.

The cam follower 4, received in the housing 3, is generally column-shaped. The cam follower 4 has a first follower end 40 and a counteractive portion 46 adjoining the first follower end 40. A diameter of the first follower end 40 is greater than that of the counteractive portion 46. An extremity of the counteractive portion 46 distal from the first follower end 40 is defined as a second follower end 41 of the cam follower 4. A through hole 42 is defined in the cam follower 4 along an axis thereof. A shape of the through hole 42 is the same as a cross-section of the flattened shaft portion 14 of the shaft 1. The through hole 42 has a diameter small enough to stop the cam follower 4 rotating relative to the flattened shaft portion 14, but large enough to allow the cam follower 4 to slide along the flattened shaft portion 14. A pair of opposite valleys 44 are defined on the first follower end 40. A pair of opposite peaks 45 are formed on the first follower end 40, the peaks 45 separating the valleys 44 from each other. Thus, the valleys 44 and the peaks 45 cooperatively form a cam surface 48. In the illustrated embodiment, the valleys 44 are symmetrically opposite each other, and the peaks 45 are symmetrically opposite each other.

The spring 5, which is received in the housing 3 and surrounds the shaft 1, is helical and column-shaped. One end of the spring 5 is coiled around the counteractive portion 46 of the cam follower 4, and the opposite end of the spring 5 abuts the arresting member 6.

The arresting member 6, which is engaged in the main housing 300 of the foldable mobile phone, is a polygonal prism. A through hole 62 is defined in the arresting member 6 along an axis thereof. A shape of the through hole 62 is the same as the cross-section of the flattened shaft portion 14 of the shaft 1. The through hole 62 has a diameter small enough to stop the flattened shaft portion 14 rotating relative to the arresting member 6. A pair of aligned pinholes 64 is defined in the arresting member 6. The pinholes 64 are aligned perpendicular to the through hole 62, and are for receiving the pin 7.

Figure 3:
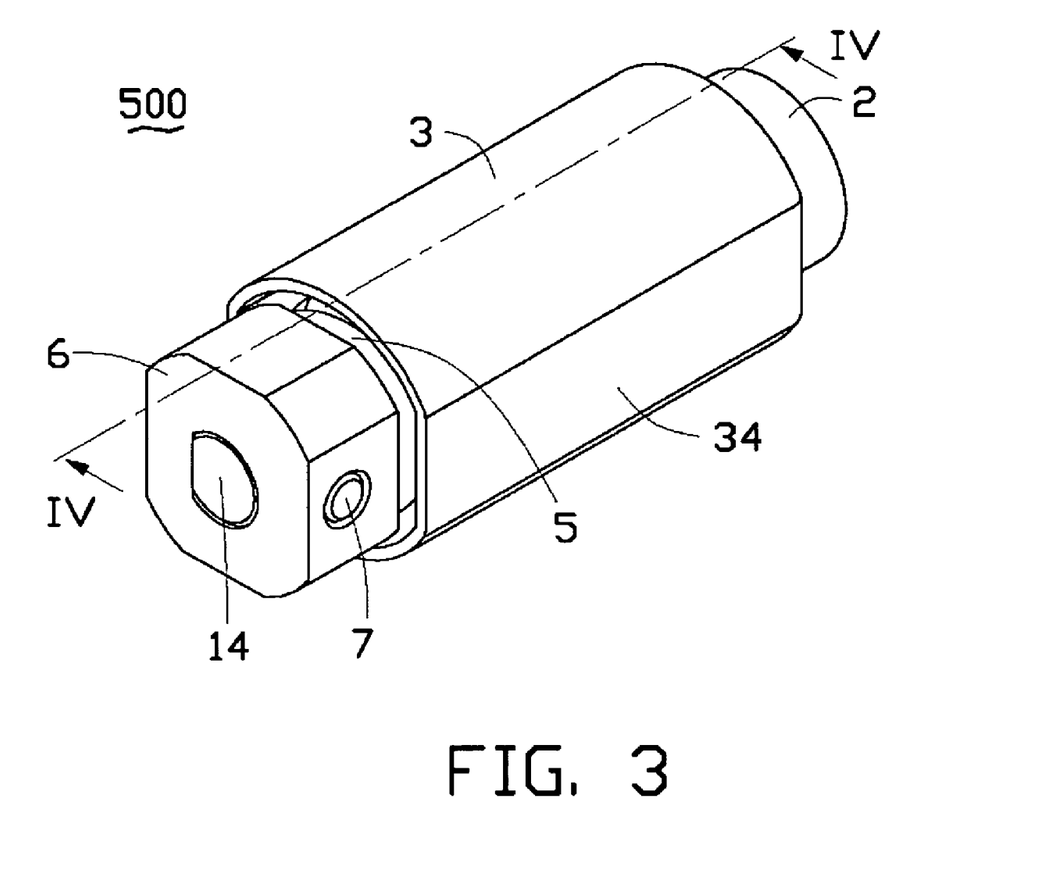
FIG. 3 is an assembled view of the hinge mechanism of FIG. 1, but viewed from another aspect.

In assembly of the hinge mechanism 500, firstly, the flattened shaft portion 14 of the shaft 1 is passed through the cam 2, the housing 3, the cam follower 4, the spring 5, and the arresting member 6. The flange 12 of the shaft 1 is contained in the fixing hole 24. The tips 22 of the cam 2 are received in the central hole of the housing 3 at the second housing end 31, so as to form a cam surface together with the transverse inner end face 36 of the transverse wall 35 of the second housing end 31 of the housing 3. The cam follower 4 and the spring 5 are received in the central hole of the housing 3. The flattened shaft portion 14 non-rotatably engages in the through hole 42 of the cam follower 4 and the through hole 62 of the arresting member 6. The spring 5 biases the cam follower 4 and the cam 2 into engagement. The valleys 44 of the cam follower 4 receive the tips 22 of the cam 2. The pin 7 is fixed into the pinholes 64 of the arresting member 6 and the transverse hole 16 of the shaft 1, so that the hinge mechanism is assembled into a unified whole, as shown in FIG. 3. The flange 12 of the shaft 1 prevents the cam 2 from falling off from the shaft 1, and the arresting member 6 prevents the spring 5 from falling off from the shaft 1. The tips 22 of the cam 2 are located in the central hole of the housing 3 at the second housing end 31, and the keyed portion 23 of the cam 2 is located in the keyed hole 32 of the second housing end 31. The base 21 of the cam 2 protrudes beyond the housing 3. The arresting member 6 is located adjacent to the first housing end 30. The cam 2 is prevented from sliding further into the housing 3 by the transverse wall 35. The opening of the first housing end 30 allows the arresting member 6 to slide into/within the housing 3.

Figure 4:
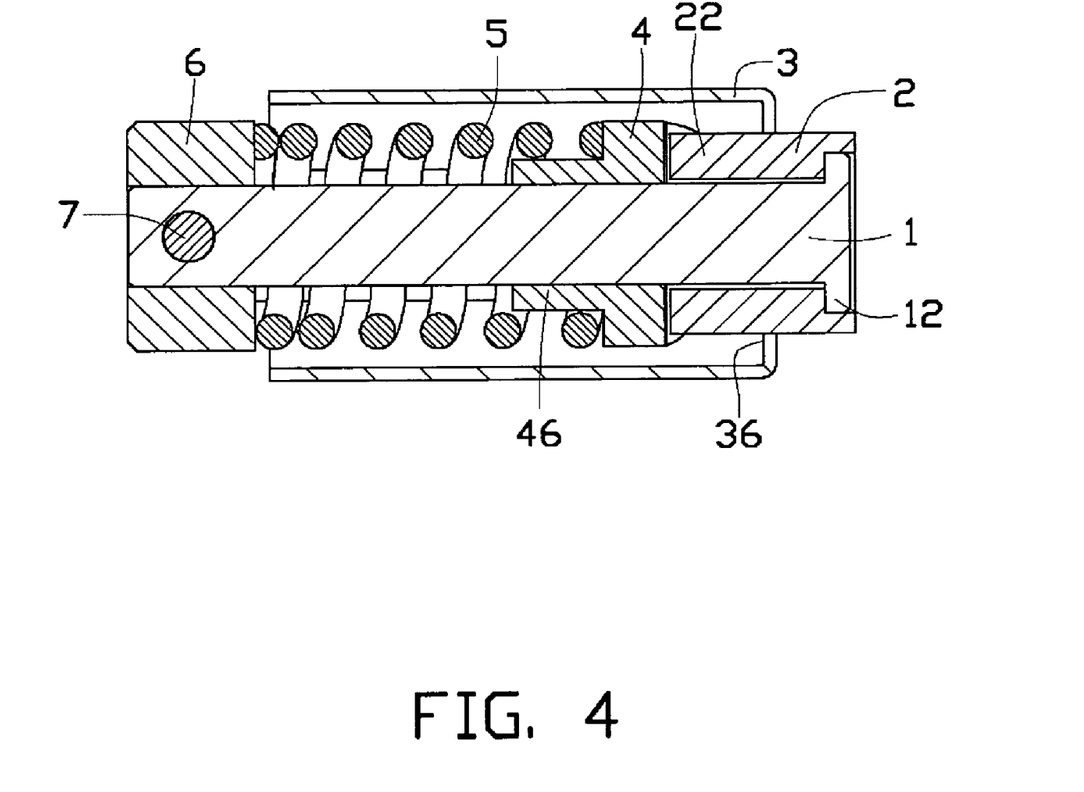
FIG. 4 is a cross-sectional view of FIG. 3 taken along line IV-IV thereof, showing the hinge mechanism in a state corresponding to a closed position of a foldable mobile phone in which the hinge mechanism can be used.
Figure 6:
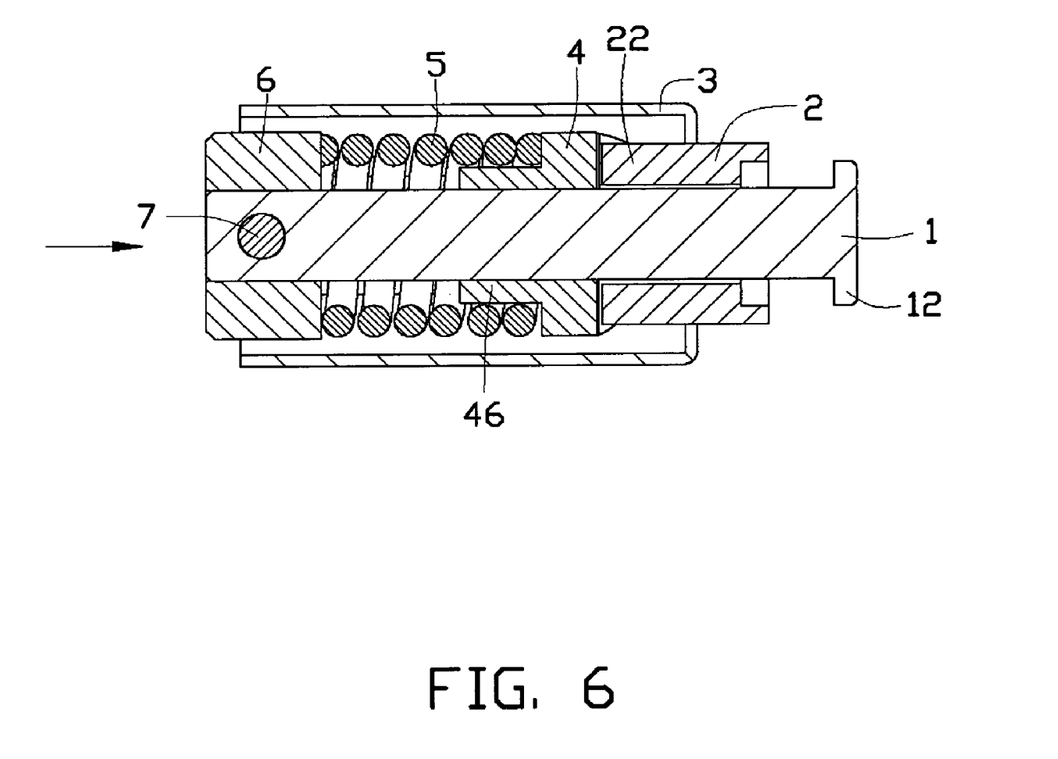
FIG. 6 is similar to FIG. 4, but showing still another state of the hinge mechanism, in which the hinge mechanism is ready for installation into a device, such as a foldable mobile phone.

Referring to FIG. 7, the hinge mechanism 500 can then be installed in corresponding joint portions of the foldable mobile phone. The housing 3 non-rotatably engages in a cavity of the cover 400, and the arresting member 6 non-rotatably engages in a knuckle of the main housing 300. In particular, during assembling, at first, the hinge mechanism 500 is in an original state, as shown in FIG. 4. Then, referring also to FIG. 6, the arresting member 6 is pressed into the housing 3. This arrangement makes the shaft 1 slide together with the arresting member 6 relative to the housing 3, while simultaneously the spring 5 is compressed. The housing 3 is engaged in the cover 400. Then, the pressure on the arresting member 6 is released. The spring 5 decompresses and drives the arresting member 6 to engage in the knuckle of the main housing 300. In the process, the cam 2 and the cam follower 4 do not slide (or slide only a small distance) relative to the housing 3, because the base 21 of the cam 2 is stopped by the transverse wall 35 of the housing 3. When the cover 400 is closed onto the main housing 300, the two tips 22 of the cam 2 lie in the two valleys 44 of the cam follower 4, as shown in FIG. 4.

Figure 5:
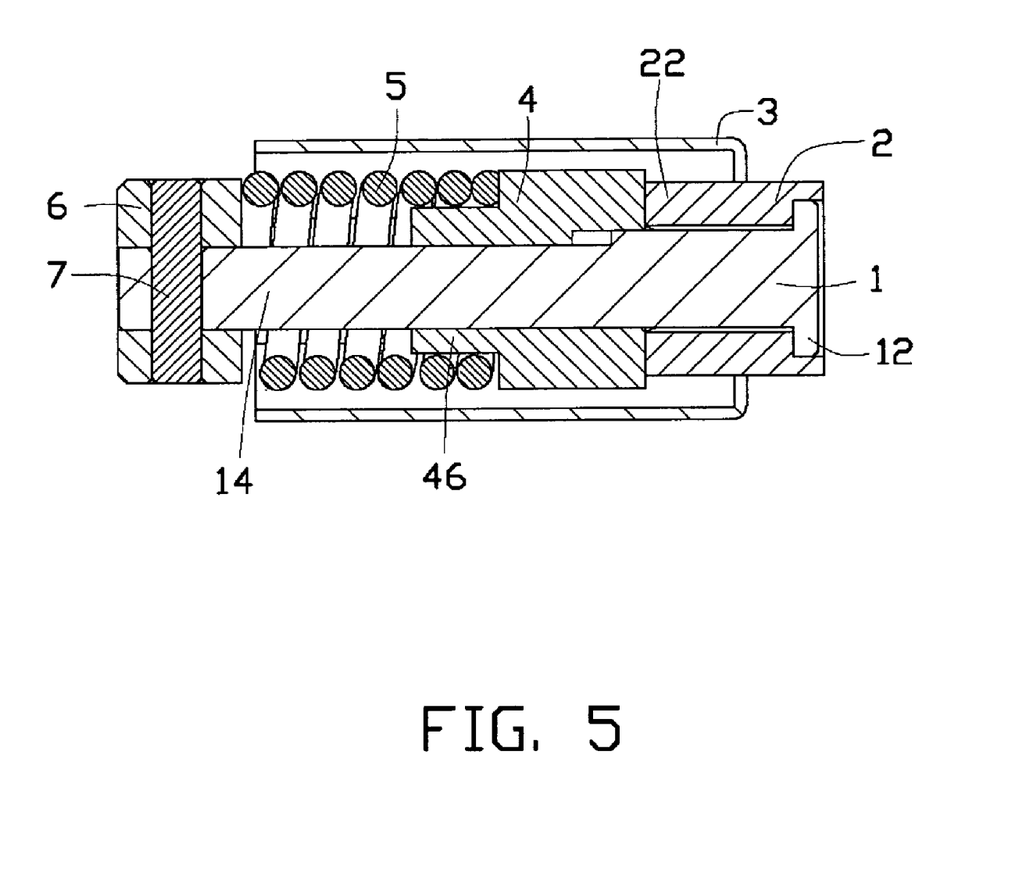
FIG. 5 is similar to FIG. 4, but showing another state of the hinge mechanism approximately halfway between the closed state and an open state.

In use, when the cover 400 is manually rotated up toward an open position, the housing 3 and the cam 2 rotate together with the cover 400. Because the shaft 1 and the arresting member 6 are fixed to the main housing 300, and because the cam follower 4 is non-rotatable and slidable relative to the shaft 1, the cam 2 drives the cam follower 4 to slide along the flattened shaft portion 14 of the shaft 1. In particular, the tips 22 of the cam 2 slide out of the valleys 44 of the cam follower 4, and drive the cam follower 4 to move toward the arresting member 6, simultaneously compressing the spring 5. When the tips 22 of the cam 2 reach the peaks 45 of the cam follower 4, the spring 5 is compressed to its shortest length, as shown in FIG. 5. Once the tips 22 have passed over the peaks 45, the manual rotation of the cover 400 is stopped. The spring 5 decompresses, and the cam follower 4 drives the cam 2 to rotate until the tips 22 of the cam 2 engage in the valleys 44 of the cam follower 4. Thus, the cover 400 continues to rotate relative to the main housing 300 until the cam 2 stops rotating. At this point, the cover 400 is in the open position. Alternatively, the cover 400 can be opened to a prearranged angle, as limited by one or more corresponding structures provided on the main housing 300 or/and the cover 400. The process of closing the cover 400 is substantially the reverse of the above-described opening process.

In an alternative embodiment, the spring 5 can instead be another elastic member, such as a rubber element.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge mechanism for a foldable electronic device, comprising:
   a shaft having a pair of shaft ends;
   a cam having a cam tip;
   a housing having opposite housing ends, one housing end being an open housing end, the opposite housing end being a partially open housing end, the partially open housing end comprising a transverse wall and a keyed hole defined in the transverse wall;
   an arresting member;
   a cam follower having a cam surface arranged to movably contact the cam tip; and
   an elastic member for providing an elastic force;
   wherein the cam, the cam follower, the elastic member and the arresting member surround the shaft in turn, the cam follower and the elastic member are received in the housing, the cam is disposed at the partially open housing end with the tip of the cam being received in the housing, the transverse wall of the partially open housing end prevents the cam from sliding further into the housing, the arresting member is disposed adjacent to the open housing end; and
   further wherein the arresting member can slide into the housing, the cam is rotatable relative to the shaft and non-rotatable relative to the housing, and the cam follower is slidable and non-rotatable relative to both the shaft and the arresting member and rotatable relative to the housing.

2. The hinge mechanism as claimed in claim 1, wherein a flange is formed at one shaft end of the shaft to stop the cam from falling off from the shaft, and the arresting member is disposed at another shaft end of the shaft to prevent the elastic member from falling off from the shaft.

3. The hinge mechanism as claimed in claim 1, further comprising a pin, wherein the shaft defines a transverse hole with an axis perpendicular to an axis of the shaft, the arresting member defines at least one pinhole with an axis perpendicular to a main axis of the arresting member, and the pin is fixed in the transverse hole and the at least one pinhole so as to prevent the arresting member from disengaging from the shaft.

4. The hinge mechanism as claimed in claim 1, wherein the cam further comprises a base and a keyed portion disposed between the base and the tips, the keyed portion engaging in the keyed hole to prevent the cam from rotating relative to the housing.

5. The hinge mechanism as claimed in claim 1, wherein the shaft comprises a flattened shaft portion having a flat surface, the cam follower and the arresting member each define a through hole having a shape the same as a cross-section of the flattened shaft portion, and the flattened shaft portion of the shaft engages in the through holes of the cam follower and the arresting member so as to prevent the cam follower and the arresting member from rotating relative to each other.

6. The hinge mechanism as claimed in claim 1, wherein the housing is substantially a flattened cylinder, and the cam and the cam follower are substantially cylindrical.

7. The hinge mechanism as claimed in claim 1, wherein the elastic member is a spring, the cam follower comprises a counteractive portion, and one end of the spring is disposed around the counteractive portion.

8. The hinge mechanism as claimed in claim 1, wherein the cam surface of the cam follower comprises a peak and a valley for movably engaging with the tip of the cam.

9. A foldable electronic device, comprising:
   a main housing;
   a cover; and
   a hinge mechanism for hinging the main housing and the cover, comprising:
   a shaft having a pair of shaft ends;
   a cam having a cam tip;
   a hinge housing having opposite housing ends, one housing end being an open housing end, the opposite housing end being a partially open housing end, the partially open housing end comprising a transverse wall and a keyed hole defined in the transverse wall, the hinge housing non-rotatably engaging with one of the main housing and the cover;
   an arresting member non-rotatably engaging with the other one of the main housing and the cover;
   a cam follower having a cam surface arranged to movably contact the cam tip; and
   an elastic member;
   wherein the cam, the cam follower, the elastic member and the arresting member surround the shaft in turn, the cam follower and the elastic member are received in the hinge housing, the cam is disposed at the partially open housing end with the tip of the cam being received in the hinge housing, the transverse wall at the partially open housing end prevents the cam from sliding further into the hinge housing, the arresting member is disposed adjacent to the open housing end and is sized smaller than an opening of the open housing end, the cam is rotatable relative to the shaft and non-rotatable relative to the hinge housing, and the cam follower is slidable and non-rotatable relative to both the shaft and the arresting member and rotatable relative to the hinge housing.

10. The foldable electronic device as claimed in claim 9, wherein a flange is formed at one shaft end of the shaft to stop the cam from falling off from the shaft, and the arresting member is disposed at the other shaft end of the shaft to stop the elastic member from falling off from the shaft.

11. The foldable electronic device as claimed in claim 9, wherein the cam further comprises a base and a keyed portion disposed between the base and the tip, the keyed portion engages in the keyed hole to prevent the cam from rotating relative to the hinge housing.

12. The foldable electronic device as claimed in claim 9, wherein the shaft comprises a flattened shaft portion having a flat surface, the cam follower and the arresting member each define a through hole having a shape the same as a cross-section of the flattened shaft portion, and the flattened shaft portion of the shaft engages in the through holes of the cam follower and the arresting member so as to prevent the cam follower and the arresting member from rotating relative to each other.

13. The foldable electronic device as claimed in claim 9, wherein the hinge housing is substantially a flattened cylinder for facilitating engagement of the hinge housing with one of the main housing and the cover, and the arresting member has a polygonal-shaped cross-section for facilitating engagement of the arresting member with the other one of the main housing and the cover.

14. The foldable electronic device as claimed in claim 12, wherein the cam and the cam follower are substantially cylindrical, and the flattened shaft portion of the shaft runs through the cam and the cam follower.

15. The foldable electronic device as claimed in claim 9, wherein the cam surface of the cam follower comprises a peak and a valley for movably engaging with the tip of the cam.

16. The foldable electronic device as claimed in claim 9, wherein the elastic member is a spring, the cam follower comprises a counteractive portion, and one end of the spring is disposed around the counteractive portion.

17. The foldable electronic device as claimed in claim 9, wherein the hinge mechanism further comprises a pin, the shaft defines a transverse hole with an axis perpendicular to an axis of the shaft, the arresting member defines at least one pinhole with an axis perpendicular to a main axis of the arresting member, and the pin is fixed in the transverse hole and the at least one pinhole so as to prevent the arresting member from disengaging from the shaft.

18. An electronic device comprising:
a first part defining a side to be exposable;
a second part attached to said first part and movable relative to said first part between a first position thereof where said second part abuts against and covers said side of said first part, and a second position where said second part moves away from said side of said first part to expose said side of said first part; and
a hinge mechanism interconnecting said first and second parts and used to contribute to movement of said second part relative to said first part between said first and second positions of said second part, said hinge mechanism comprising a housing attached to and movable together with one of said first and second parts and a shaft attached to and movable together with the other of said first and second parts, said housing having a partially open end and an opposite open end, a cam of said hinge mechanism partially received in said housing at said partially open end of said housing so as to form a cam surface in said housing, the part of the cam received in the housing being in cooperation with a transverse inner end face of a transverse wall of said partially open end of said housing to form the cam surface, said cam surface being engagable with a cam follower slidably engaged around said shaft so as to controllably guide said movement of said second part between said first and second positions of said second part, and said partially open end of said housing preventing said cam from sliding further into said housing, and an elastic member enabling the cam and the cam follower to engage or disengage, so as to guide the movement between the first position and the second position.

19. The electronic device as claimed in claim 18, wherein said cam comprises a tip engagable with the cam follower, a base, and a keyed portion disposed between the base and the tip, the keyed portion of said cam engaging in the keyed hole to prevent said cam from rotating with respect to said housing.

20. The electronic device as claimed in claim 18, wherein said hinge mechanism further comprises a pin and an arresting member disposed at said open end of said housing, said shaft defines a transverse hole with an axis perpendicular to an axis of said shaft, the arresting member defines at least one pinhole with an axis perpendicular to a main axis of the arresting member, and the pin is fixed in the transverse hole and the at least one pinhole so as to prevent the arresting member from disengaging from said shaft.

* * * * *